United States Patent [19]
Amersfoort et al.

[11] Patent Number: 5,862,279
[45] Date of Patent: Jan. 19, 1999

[54] OPTICAL DEVICE WITH PHASED ARRAY

[75] Inventors: Martin R. Amersfoort, Shrewsbury Township, N.J.; Pierre-André Besse, Renens; Hans Melchior, Zürich, both of Switzerland; Meint K. Smit, Delft; Cornelis Van Dam, Zoetermeer, both of Netherlands

[73] Assignee: U.S. Philips Corporation, New York, N.Y.

[21] Appl. No.: 838,817

[22] Filed: Apr. 10, 1997

Related U.S. Application Data

[63] Continuation of Ser. No. 388,650, Feb. 13, 1995, abandoned.

[30] Foreign Application Priority Data

| Feb. 11, 1994 | [EP] | European Pat. Off. | 94200368 |
| Mar. 4, 1994 | [EP] | European Pat. Off. | 94200548 |
| Jan. 26, 1995 | [EP] | European Pat. Off. | 95200182 |

[51] Int. Cl.⁶ .................. G02B 6/26; G02B 6/42; G02B 6/10
[52] U.S. Cl. .................. 385/40; 385/24; 385/27; 385/37; 385/14; 385/129; 385/131
[58] Field of Search .................. 385/40, 41, 46, 385/48, 32, 37, 24, 27, 17, 43, 14, 129–132

[56] References Cited

U.S. PATENT DOCUMENTS

| 4,726,643 | 2/1988 | Imoto et al. | 385/43 |
|---|---|---|---|
| 4,768,850 | 9/1988 | Moslehi et al. | 385/24 |
| 4,900,119 | 2/1990 | Hill et al. | 385/27 |
| 5,002,350 | 3/1991 | Dragone | 385/24 X |
| 5,119,453 | 6/1992 | Gonthier et al. | 385/43 |
| 5,212,758 | 5/1993 | Adar et al. | 385/129 |
| 5,243,672 | 9/1993 | Dragone | 385/46 |
| 5,247,594 | 9/1993 | Okuno et al. | 385/17 |
| 5,351,317 | 9/1994 | Weber | 385/3 |
| 5,367,586 | 11/1994 | Glance et al. | 385/24 |
| 5,412,744 | 5/1995 | Dragone | 385/24 |
| 5,414,548 | 5/1995 | Tachikawa et al. | 385/24 |
| 5,425,116 | 6/1995 | Dragone et al. | 385/24 |
| 5,461,685 | 10/1995 | Glance et al. | 385/24 |
| 5,467,418 | 11/1995 | Dragone | 385/37 |
| 5,559,906 | 9/1996 | Marez | 385/40 |
| 5,636,300 | 6/1997 | Keck et al. | 385/24 |

FOREIGN PATENT DOCUMENTS

| 0565308 | 10/1993 | European Pat. Off. |
| 2664992 | 1/1992 | France . |
| 9325923 | 12/1993 | WIPO . |

*Primary Examiner*—Hemang Sanghavi
*Attorney, Agent, or Firm*—Leroy Eason

[57] ABSTRACT

An optical device, such as for example a wavelength division multiplexer/demultiplexer, a wavelength router, an optical comb filter or a planar lens, having a first coupler and a second coupler which are connected by an array of optical waveguide channels. At least one of the couplers is a multimode imaging component (MMI), which has the property that the radiation distribution at any input thereof is imaged onto each of the coupler outputs and with uniform power distribution among the outputs. Efficient power transfer in thereby achieved. Phase differences between the inputs and the outputs are compensated by appropriate differences in optical pathlength of neighboring channels in the array.

11 Claims, 7 Drawing Sheets

OPTICAL DEVICE WITH PHASED ARRAY

This is a continuation of application Ser. No. 08/388,650, filed Feb. 13, 1995, now abandoned.

BACKGROUND OF THE INVENTION

1. Field of the Invention

The invention relates to an optical device comprising a first coupler, a second coupler and a plurality of at least three optical channels connecting outputs of the first coupler to inputs of the second coupler and forming a dispersive array.

Such a device is particularly useful as an array multiplexer or demultiplexer because of its wavelength dependent behaviour due to the dispersive array. The dispersion gives the device a wavelength selectivity in the range from 0.1 nm to about 200 nm. A wavelength division multiplexer/demultiplexer (WDM) can be used as a multiplexer in the field of optical communications to combine optical beams at pump and signal wavelengths in an optical amplifying system. WDMs can also be used to increase the transmission capacity of optical fibres by adding closely spaced wavelength bands. Different wavelength bands can be used to provide bidirectional transmission on a single fibre. A WDM also can be used as a demultiplexer to perform the operation opposite to that of a multiplexer, i.e. decomposing an incoming signal into its constituting wavelength bands.

2. Description of the Related Art

An optical device of the type described in the opening paragraph is described in the European patent application nr. 0 565 308. The known device comprises a pair of optical couplers and an array of channels extending between the couplers. The couplers are so-called radiative couplers. Such a coupler is typically a slab waveguide configured for providing substantially identical optical paths between an input channel and a plurality of coupler output channels. A drawback of the known device is the non-uniform channel response, i.e. the power transmission from an input channel to an output channel of the device depends on the ordinal numbers of the input and output channel.

SUMMARY OF THE INVENTION

It is an object of the invention to provide an optical device with an essentially uniform channel response.

The object of the invention is achieved in that in the above-mentioned optical device is at least one of the couplers is a multimode-imaging component. The non-uniform channel response of the known device is a result of the way radiative couplers function: the power from an input channel of such a coupler is distributed in a bell shape over its output channels, such that the outermost output channels receive only a few percent of the power received by the central output channel. On the other hand, a multi-mode imaging (MMI) coupler as used herein allows an equal distribution of the power from an input channel over its output channels. The equal distribution results in a uniform channel response of the device according to the invention.

When using MMI couplers, care must be taken to compensate for phase differences occurring between the signals in the outputs of the MMI when an input of the MMI is irradiated. Moreover, when the irradiation is changed to another input, the phase differences also change. The compensation for these differences can in principle be made anywhere in the device. However, a preferred embodiment of the device according to the invention is further characterized in that phase differences between optical paths in the multimode-imaging component are compensated by differences in optical pathlength of the channels. It is an unexpected feature of the device according to the invention that no additional component is required for the compensation of the phase differences and that fixed length differences of the waveguides in the array suffice. These differences in optical pathlength are in general smaller than a reference wavelength over the refractive index of the channels.

A preferred embodiment of the optical device according to the invention is characterized in that differences in optical pathlength between neighbouring channels are substantially equal to an integer function times a basic length, where the value of the function depends on the ordinal numbers of the neighbouring channels in the array. Hence, the length difference between neighbouring waveguides in the array has not a constant value, as is the case in the known device. 'Substantially equal' means equal within the reference wavelength divided by the refractive index of the channels.

A preferred embodiment is characterized in that the first coupler has two inputs and N outputs and the second coupler has N inputs and N outputs, with N an integer larger than 2.

In an embodiment of the device with 'U' shaped channels between the couplers the lengths of the channels have to increase monotonically in order to avoid crossing of the channels. The increase is realized by adding an integral number of basic lengths to the length of each channel. As a consequence, the width of the wavelength windows with low crosstalk is reduced. An embodiment of the optical device with sufficiently wide windows has an 'S' shaped configuration of the optical channels. The length differences can then be kept minimal, which also has the advantage of an increased manufacturing tolerance. The crosstalk between output channels of the device is reduced when the absolute value of the difference in optical pathlength between an optical channel and a neighbouring optical channel of higher ordinal number is a monotonically increasing function of the ordinal number, and two consecutive differences have different signs.

Another embodiment with increased manufacturing tolerances is characterized in that different optical channels of the passive array comprise a different number of sinusoidal bends. The different number of bends provide the different pathlengths of the channels. The ways in which the bends may be formed and combined allow a great variety of pathlengths of the device. This embodiment may easily be integrated into a compact unit and allows the two couplers to be placed in line.

An embodiment of the optical device allowing electrical control of its transmission function is characterized in that an electrode overlays at least one channel for introducing changes in optical path length of the at least one channel. A special layout of the electrodes on the channels allows control of the transmission function with a single voltage applied to the electrodes.

Since the presence of electrodes may affect the optical behaviour of the channels and different electrode lengths may cause different behaviour of the channels, the properties of the optical device will be affected. Therefore, the optical device according to the invention is preferably provided with an electrode structure which overlays the same length of each channel.

BRIEF DESCRIPTION OF THE DRAWINGS

The invention will now be described in greater detail by way of example with reference to the accompanying drawings in which.

DESCRIPTION OF THE PREFERRED EMBODIMENTS

Figure 1:
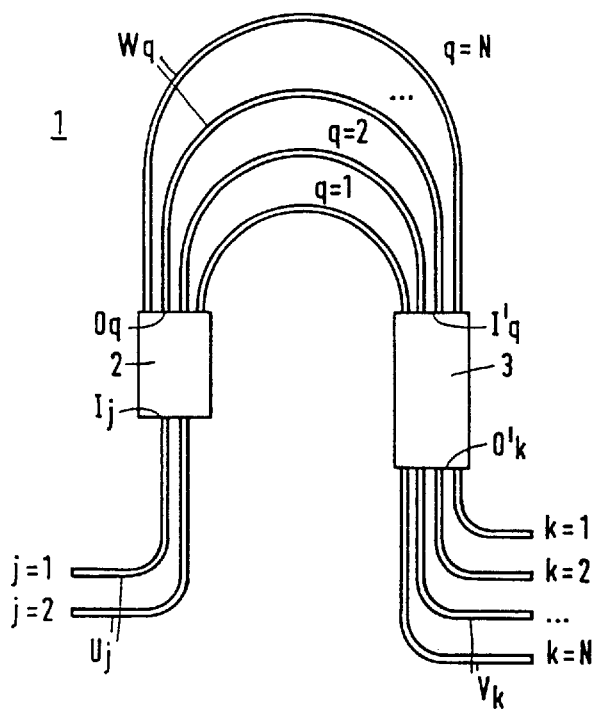
FIG. 1 shows a WDM according to the invention.

FIG. 1 shows a WDW 1 used as a channel array demultiplexer according to the invention, comprising a first coupler 2 coupled via an array of N channels $W_q$, where q is an ordinal number q=1, ..., N, to a second coupler 3. The N channels between the couplers 2 and 3 are arrayed in a 'U' configuration, with each successive channel providing an optical path which is longer than its predecessor. Each array channel $W_q$ connects an output $O_q$ of the first coupler to an input $I'_q$ of the second coupler. The input of the device consists of input channels $U_j$, with j=1, 2, each of which is connected to an input $I_j$ of the first coupler. The output of the device consists of output channels $V_k$, with k=1, ..., N, each of which is connected to the corresponding output $O'_k$ of the second coupler.

According to the invention the couplers are multi-mode imaging components (MMIs). An MMI is also known under the name 'multi-mode interference device', and has been disclosed in the German patent no. 25 06 272. An MMI has the property that the radiation distribution at one of its inputs is imaged onto each of its outputs. The array of the device is designed such that for a specific wavelength $\lambda_0$ the phase difference between the optical path from a specific input $I_j$ through the first coupler along an array channel $W_q$ and through the second coupler to the output $O'_k$ and the optical path from the same input along another channel $W_{q+1}$ to the same output is equal to a multiple of 2π. The optical waves travelling along the different paths in the array will then interfere constructively, causing energy at wavelength $\lambda_0$ entering the device at input $I_j$ to be transmitted to output $O'_k$. At a different wavelength the optical waves will not interfere constructively at output $O'_k$ but at another output. The device can thus be used to receive a multiple-wavelength input and provide wavelength separated outputs. The device therefore acts as a grating and a demultiplexer. In the reverse direction it can act as a multiplexer.

The device according to the invention makes optimum use of the properties of MMIs. The wide tolerances of the dimensions of the component make the performance of the MMI less dependent on the process parameters of the manufacturing steps for integrated optical devices. In particular, the use of MMI couplers avoids the lithographic problems involved in opening vertices between closely spaced waveguide channels. So the demands on the manufacturing technology of MMIs are relatively mild. This applies specifically to MMIs made of InP, a material frequently used for deeply etched integrated optical components. Hence, the low losses characteristic of MMIs are maintained even for an MMI of slightly non-optimum dimensions.

Figures 2A, 2B:
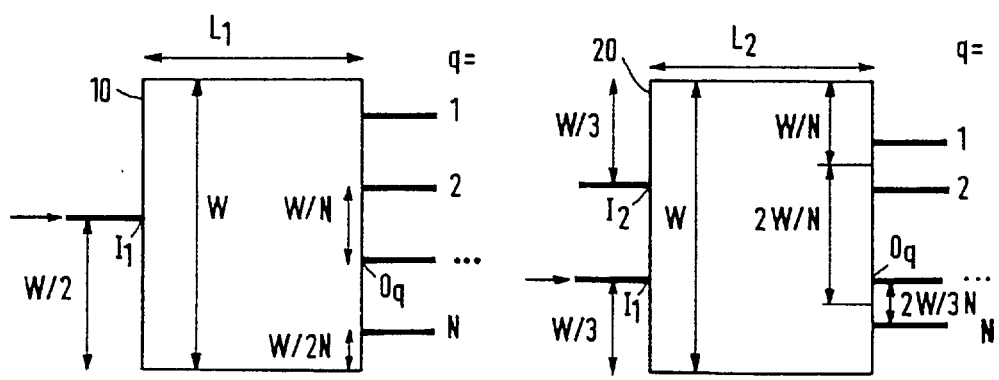
FIG. 2A shows a 1×N MMI coupler.
FIG. 2B shows a 2×N MMI coupler.

FIG. 2 shows a few examples of M×N MMI couplers, where M is the number of inputs and N the number of outputs of the coupler. The 1×N coupler 10 presented in FIG. 2A has a length $L_1=3 L_c/(4N)$ with $L_c=4 nW^2/(3\lambda_0)$, where n is the guide index and W is the width of the MMI, and $\lambda_0$ is the free space wavelength of the radiation. With the input $I_1$ half-way the width of the MMI, as shown in FIG. 2A, N images of the input will be found at the side of the MMI opposite the input side and at a mutual spacing of W/N. The phase difference between input $I_1$ and output $O_q$ is given by $$\phi_{1,q} = \phi_0 + \frac{\pi}{N}(q-1)(N-q) \text{ for } q=1,\ldots,N \qquad (1)$$

where $\phi_0$ is a constant phase factor.

FIG. 2B shows a 2×N MMI coupler 20 with a length $L_2=L_c/N$. The two inputs are positioned at ⅓ and ⅔ of the width W, while the outputs are positioned as indicated in the Figure. The phase difference between input $I_1$ and output $O_q$ for N is even is given by $$\phi_{1,q} = \phi_0 + \frac{\pi}{4N}(-3q^2+2q) \text{ for } q \text{ odd, and} \qquad (2)$$

$$\phi_{1,q} = \phi_0 + \pi + \frac{\pi}{4N}(-3q^2+4q-1) \text{ for } q \text{ even.} \qquad (3)$$

Figure 2C:
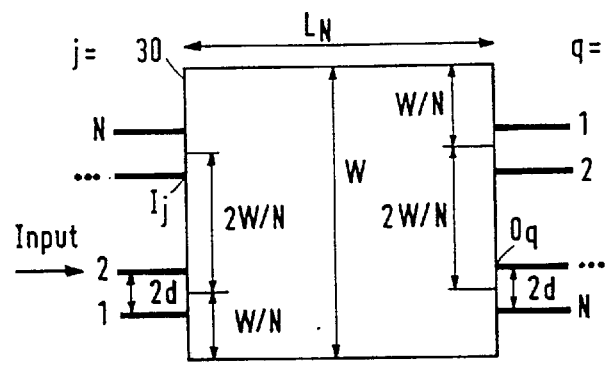
FIG. 2C shows an N×N MMI coupler.

The N×N MMI coupler 30 as shown in FIG. 2C has both the input and output ports ordered in pairs. Within each pair the distance of the ports is 2d, where d is a free parameter. The length $L_N$ is equal to $3 L_c/N$. Mark the different order of numbering of inputs and of outputs. The phase difference between input $I_j$ and output $O_q$ for N even is given by $$\phi_{j,q} = \phi_0 + \frac{\pi}{4N}[(2N+1-q-j)(q+j-1)] \text{ for } j+q \text{ odd, and} \qquad (4)$$

$$\phi_{j,q} = \phi_0 + \pi + \frac{\pi}{4N}[(2N-q+j)(q-j)] \text{ for } j+q \text{ even.} \qquad (5)$$

For all types of MMI the phase difference from an input to an output is equal to the phase difference from the same output to the same input, in other words, $\phi_{j,q}$ is equal to $\phi_{q,j}$. It is remarked that the phases depend on time t and place x according to exp (iωt−kx).

The above phase behaviour of the MMI presents difficulties in the design of a multiplexer or demultiplexer comprising MMI couplers. A signal at one input of the MMI results in a signal in each of its outputs with non-zero phase differences between the output signals. When the signal is changed to another input, the phase differences between the outputs also change. These phase differences are compensated in the design of the demultiplexer according to the invention. The demultiplexer is designed as a generalized Mach-Zehnder interferometer in which the desired phase shifts are realized by length differences of the paths in the interferometer. The design is for the case that the number N of array channels $W_q$ is equal to the number of output channels $V_k$, i.e. the second coupler is an N×N MMI. In case less than N output channels are desired, the design can still be made for an N×N MMI, but a number of outputs will not be used.

As a first step of the design of the wavelength demultiplexer, the lengths of the N array channels are determined such that a maximum amount of radiation at a selected reference wavelength $\lambda_0$ passes the demultiplexer from a selected input to a selected output. For this particular design (see FIG. 1) the input is input $I_j$ of the first coupler 2 and, by way of example, the output is output $O'_3$ of the second coupler 3. To obtain an optimum transmission of the radiation from said input to said output, the N optical paths from input $I_j$ through the first coupler, the array channels and the second coupler to the output $O'_3$ must have lengths which mutually differ only by a multiple of $\lambda_0$ in order to have constructive interference at the output between beams having travelled along different array channels. In terms of phases this amounts to:

$$(\phi_{j,q}-\phi_{j,1})+\Delta\psi_q+(\phi'_{q,3}-\phi'_{1,3})=2\pi m_q \text{ for } q=1,\ldots,N. \quad (6)$$

The phases $\phi$ and $\phi'$ are the phase differences introduced in the first and second coupler respectively. $\Delta\psi_q$ is the phase difference between array channels $W_q$ and $W_1$. The parameter $m_q$ is an integer. The phase difference $\Delta\psi_q$ is equal to $$\Delta\psi_q = \frac{-2\pi n_0 \Delta L_q}{\lambda_0} \quad (7)$$

with $n_0$ the effective refractive index of the channels and $\Delta L_q$ the increment in length between array channels $W_q$ and $W_1$. When writing $\Delta L_q \equiv \delta l_q + \delta L_q$, with $\delta l_q$ a length increment smaller than $\lambda_0/n_0$ and $\delta L_q$ a length increment equal to a multiple of $\lambda_0/n_0$, and $$g(q) = -(\phi_{j,q}-\phi_{j,1})-(\phi'_{q,3}-\phi'_{1,3}). \quad (8)$$

eq. (7) can be written as $$\frac{-2\pi n_0}{\lambda_0}(\delta l_q + \delta L_q) = g(q) + 2\pi m_q. \quad (9)$$

Equating the corresponding terms on both sides of the equal sign leads to the following two expressions:

$$n_0 \delta l_q = -g(q)\frac{\lambda_0}{2\pi} \quad (10)$$

$$n_0 \delta L_q = -m_q \lambda_0. \quad (11)$$

Eq. (11) merely states that the length of a channel $W_q$ may change by an integer multiple of $\lambda_0/n_0$, without specifying the integer. The value of the integer is fixed in a second step of the design of the demultiplexer. The parameters $\delta l_q$ in Eq. (10) are the length increments in the $q^{th}$ optical path which must be introduced in order to transmit radiation with the reference wavelength $\lambda_0$ from input $I_j$ to output $O'_3$. The length increments compensate for the phase differences due to the MMI couplers, and are preferably incorporated in the demultiplexer by giving the array channels different lengths. For specific choices of the two couplers in the demultiplexer the value of g(q) is zero for all values of q, as can be seen by inserting eqs. (1) to (5) in eq. (8). One such choice is the combination of a 2×N MMI and an N×N MMI. In that case the lengths of the array channels need only differ by multiples of $\lambda_0/n_0$ according to eq. (11).

The second step in the design of the demultiplexer is the implementation of the requirement to be imposed on the lengths of the array channels when radiation with a wavelength $\lambda_k$ close to $\lambda_0$ is to be transmitted from input $I_j$ to output $O'_k$. Whereas the first step determined the values of the small increments $\delta l_q$ in order to transmit radiation at the reference wavelength through the demultiplexer, the second step determines the values of the large increments $\delta L_q$ in order to give the device the desired dispersive behaviour for the transmission at other wavelengths. An optimum transmission of radiation of wavelength $\lambda_k$ requires that the following phase relations are satisfied for each of the N optical paths:

$$(\phi_{j,q}-\phi_{j,1})+\Delta\psi_q+(\phi'_{q,k}-\phi'_{1,k})=2\pi m_q \text{ for } q=1,\ldots,N, \quad (12)$$

where all phases must be evaluated at $\lambda_k$. This wavelength can be written as $$\lambda_k = \lambda_0 + p(k)\Delta\lambda, \quad (13)$$

with p(k) an integer function of k and $\Delta\lambda$ a wavelength increment. The effective index $n_k$ is now to first order in $\Delta\lambda$ equal to $$n_k = n_0 + p(k)\Delta\lambda\frac{\delta n}{\delta\lambda}. \quad (14)$$

Using eq. (7) with subscript 0 replaced by k, and eqs. (13) and (14), eq. (12) can be rewritten to $$\frac{-2\pi\left(n_0 + p(k)\Delta\lambda\frac{\delta n}{\delta\lambda}\right)(\delta l_q + \delta L_q)}{\lambda_0 + p(k)\Delta\lambda} = \quad (15)$$

$$-(\phi_{j,q}-\phi_{j,1})-(\phi'_{q,k}-\phi'_{1,k})+2\pi m_q.$$

The differences of the phases $\phi$ have no dependence on $\Delta\lambda$ to first order. Hence, neglecting terms higher than first order in $\Delta\lambda$, eq. (15) can be written as $$\frac{-2\pi n_0}{\lambda_0}[(\delta l_q + \delta L_q) - p(k)\Delta\lambda B(\delta l_q + \delta L_q)] = \quad (16)$$

$$g(q) + 2\pi m_q - (\phi'_{q,k}-\phi'_{1,k})+(\phi'_{q,3}-\phi'_{1,3})$$

with $$B = \frac{1}{\lambda_0} - \frac{1}{n_0}\frac{\delta n}{\delta\lambda}. \quad (17)$$

Taking the values of g(q) and $m_q$ from eqs. (10) and (11) and neglecting terms containing $\Delta\lambda\delta l_q$, eq. (16) reduces to $$\frac{-2\pi n_0}{\lambda_0}[p(k)\Delta\lambda B\delta L_q] = (\phi'_{q,k}-\phi'_{1,k})-(\phi'_{q,3}-\phi'_{1,3}). \quad (18)$$

The phases on the right hand side of the equation all apply to the second coupler and can be calculated with expressions such as eqs. (1) to (5). It can be shown that the right hand side can be written as a product of a function f of k and a function A of q:

$$(\phi'_{q,k}-\phi'_{1,k})-(\phi'_{q,3}-\phi'_{1,3})=f(k)A_q \quad (19)$$

Using eq. (11), eq. (18) can then be rewritten as $$m_q = m'A_q \quad (20)$$

with $$m' = \frac{f(k)}{2\pi p(k)\Delta\lambda B}. \quad (21)$$

The parameter m' is a real number. If $f(k)=-p(k)$ then $m_q$ is independent of k, and, since $m_q$ determines the length increments of the array channels $W_q$, the length increments are independent of k. Hence, one choice of lengths of the array channels gives an optimum transmission of radiation with a wavelength $\lambda_k$ to output $O'_k$ for all values of k. The order of the wavelengths at the output of the device, as defined by eq. (13), is then determined by the k-dependent part f of the phase differences of the second MMI coupler. Likewise, the length increments $\delta L_q$ of the array channels, as defined by eq. (11) are determined by the q-dependent part A.

As an example, the length increments will be calculated for an N×N MMI as second coupler. The functions f(k) and $A_q$ for the MMI can be derived from eqs. (4) and (5):

$$f(k) = \frac{(3-k)}{2} + aN \text{ for } k \text{ odd,} \tag{22}$$

$$f(k) = \frac{(2+k)}{2} + aN \text{ for } k \text{ even,} \tag{23}$$

$$A_q = \frac{2\pi}{N}\left(\frac{1-q}{2} + r_q N\right) \text{ for } q \text{ odd and} \tag{24}$$

$$A_q = \frac{2\pi}{N}\left(\frac{q}{2} + r_q N\right) \text{ for } q \text{ even.} \tag{25}$$

The parameters a and $r_q$ are freely choosable integers, which only add irrelevant factors of $2\pi$ to the phase differences of the MMI.

The form of the expressions for $A_q$ makes it possible to write eq. (20) in the following way $$m_q = -m\frac{N}{2\pi}A_q, \tag{26}$$

or, m'=−mN/(2 π). Since both $m_q$ and N/(2 π)$A_q$ are integer, m must also be integer. For this particular choice of m' eq. (21) can be rearranged to $$\frac{\lambda_0}{\Delta\lambda} = Nm\lambda_0 B = N\left(\frac{n_0}{\lambda_0} - \frac{\delta n}{\delta\lambda}\right)\frac{m\lambda_0}{n_0}. \tag{27}$$

This equation gives the resolving power $\lambda/\Delta\lambda$ of the demultiplexer in a form similar to that of an echelon. See for instance the book 'Principles of Optics' by M. Born and E. Wolf, sixth edition, Pergamon Press 1980, page 410. N is the number of steps of the equivalent echelon, $m\lambda_0/n_0$ is the pathlength difference between the steps, and m is the order in which the echelon is used. Hence, the resolving power of the device can be chosen by choosing specific values for N and m.

The length increments of the array channels follow now from eqs. (24) and (25):

$$n_0\delta L_q = s_q m\lambda_0 \tag{28}$$

$$s_q = \frac{1-q}{2} + r_q N \text{ for } q \text{ odd and} \tag{29}$$

$$s_q = \frac{q}{2} + r_q N \text{ for } q \text{ even.} \tag{30}$$

A specific choice of $r_q$ gives the required length increments $\delta L_q$ of the array channels. The length differences ($\delta L_q - \delta L_{q-1}$) of neighbouring array channels are an integer function ($s_q - s_{q-1}$) times a basic length $m\lambda_0/n_0$. From eqs. (29) and (30), combined with the requirement that $r_q$ must be integer, one can infer that ($s_q - s_{q-1}$) always depends on q. The length differences thus depend on q. Therefore, a channel array with constant length differences, as known from e.g. said European patent application nr. 0 565 308, cannot fulfil the phase relations of the optical device according to the invention. The q-dependence of the length differences has been derived for a demultiplexer using an N×N MMI output coupler and is basically valid for all types of MMI input couplers.

The geometry of the array channels in the device of FIG. 1 imposes the requirement that the length of the channels must increase with increasing number q of the channel. Then $r_q$ must satisfy the condition:

$$r_q - r_{q-1} > \frac{q-1}{N} \text{ for } q \text{ odd and} \tag{31}$$

$$r_q - r_{q-1} > \frac{1-q}{N} \text{ for } q \text{ even.} \tag{32}$$

The following choice of the parameter $r_q$ satisfies this condition:

$$r_q = \frac{q-1}{2} \text{ for } q \text{ odd and} \tag{33}$$

$$r_q = \frac{q}{2} - 1 \text{ for } q \text{ even.} \tag{34}$$

Then $$n_0\delta L_q = s_q m\lambda_0 \text{ with} \tag{35}$$

$$s_q = \frac{1-q}{2} + \frac{q-1}{2}N \text{ for } q \text{ odd and} \tag{36}$$

$$s_q = \frac{q}{2} + \left(\frac{q}{2} - 1\right)N \text{ for } q \text{ even.} \tag{37}$$

An optical device having a 2×4 MMI and a 4×4 MMI coupler according to the above design will have a phased array with lengths of the channels given by $\Delta L_q = \delta l_q + \delta L_q$, where $\delta l_q + 0$ and $\delta L_q = 0, 1, 3, 6$ times $m\lambda_0/n_0$ for q=1, 2, 3, 4 respectively. The order of the output wavelengths as defined by eq. (13) and p(k)=−f(k) is for output O'$_1$ to O'$_4$: $\lambda_0 - \Delta\lambda$, $\lambda_0 - 2\Delta\lambda$, $\lambda_0$ and $\lambda_0 - 3\Delta\lambda$ respectively.

Figure 3:
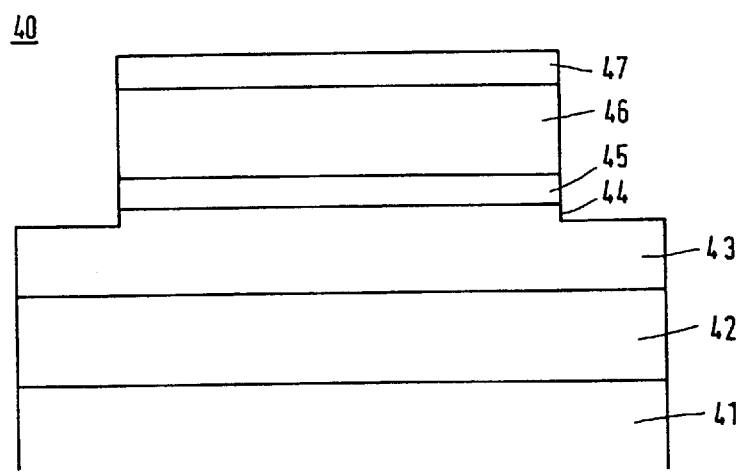
FIG. 3 shows a cross-section of a waveguide of the device.

A four-channel integrated WDM device according to FIG. 1 has been designed and realized in InGaAsP/InP using the rib-waveguide structure 40 presented in FIG. 3. The layers of the waveguide were grown by metal-organic vapour phase epitaxy (MOVPE) on an n$^+$-InP substrate 41. A quaternary InGaAsP guiding layer 43 is separated from the substrate by a 0.8 $\mu$m weakly doped n$^-$-InP layer 42. The thickness of the guiding layer is 0.5 $\mu$m outside the rib 44, while the rib has a height of 0.1 $\mu$m. The thicker part 44 of the guiding layer 43 forms the waveguide. The rib of the guiding layer is covered with a stack of InP layers, comprising a 0.3 $\mu$m thick InP layer 45 on the rib, followed by a weakly doped p$^+$-InP layer 46 with a thickness of 0.9 $\mu$m, and an outermost, weakly doped p$^+$-InP layer 47 of 0.3 $\mu$m thickness. The weak doping keeps the absorption losses of the waveguide low. The waveguides were patterned by magnetron-enhanced CH$_4$/H$_2$ reactive ion etching.

The channels of the device are waveguides having a width of 3 $\mu$m. The geometrical width and length of the first coupler, a 2×4 MMI as shown in FIG. 2B, are 29.2 $\mu$m and 638 $\mu$m respectively. The input and the inner output waveguides are placed at ⅓ and ⅔ of the effective coupler width W=30 $\mu$m. The outer output waveguides have a centre-to-centre spacing of 20 $\mu$m. The output coupler, a 4×4 MMI as shown in FIG. 2C, has a geometrical width of 19.2 $\mu$m, corresponding to an effective width of 20 $\mu$m, and a length of 850 $\mu$m. The distance 2d between ports is chosen equal to W/N, making the four ports equidistant. The input and output waveguides have a centre-to-centre spacing of 5 $\mu$m. The array waveguides are designed such that the length increments $\Delta L_q = \delta l_q + \delta L_q$ between waveguide W$_q$ and W$_1$ comply with the above design rules. The values of $\delta l_q$ as defined in eq. (10) are zero for all q's due to the particular choice of the first and second coupler. The values of $\delta L_q$ are determined with the help of eqs. (35), (36) and (37). For the choice of m=98 and $\delta_0$=1544 nm, the basic length $m\lambda_0/n_0$ is equal to 151/n$_0$ $\mu$m. The values of $s_q$ are 0, 1, 3 and 6 for q=1, 2, 3 and 4 respectively. The wavelength spacing $\Delta\lambda$ is about 3.5 nm, as can be determined from eq. (27) using a wavelength dispersion $(1/n_0)\delta n/\delta\lambda$ of $-8.10^{-5}$. The resulting values for the lengths of the array waveguides are converted to geometrical lengths using the Effective Index Method for the calculation of the index in the straight waveguides and in the bends. The Effective Index Method is described in the article 'Dielectric rectangular waveguide and directional coupler for integrated optics' by E. A. J. Marcatili in the Bell System Technical Journal 48(7)1969, pages 2103–2132. The total device measures 2.1×2.1 mm². The curved access waveguides were designed with a radius of 1 mm and a spacing of 250 μm. Due to the strong lateral confinement in the waveguides almost polarization independent characteristics are obtained for the MMIs. However, the waveguide structure itself remains birefringent. The full-width at half maximum (FWHM) of the transmission function of the device is approximately 1.5 nm.

Figure 4:
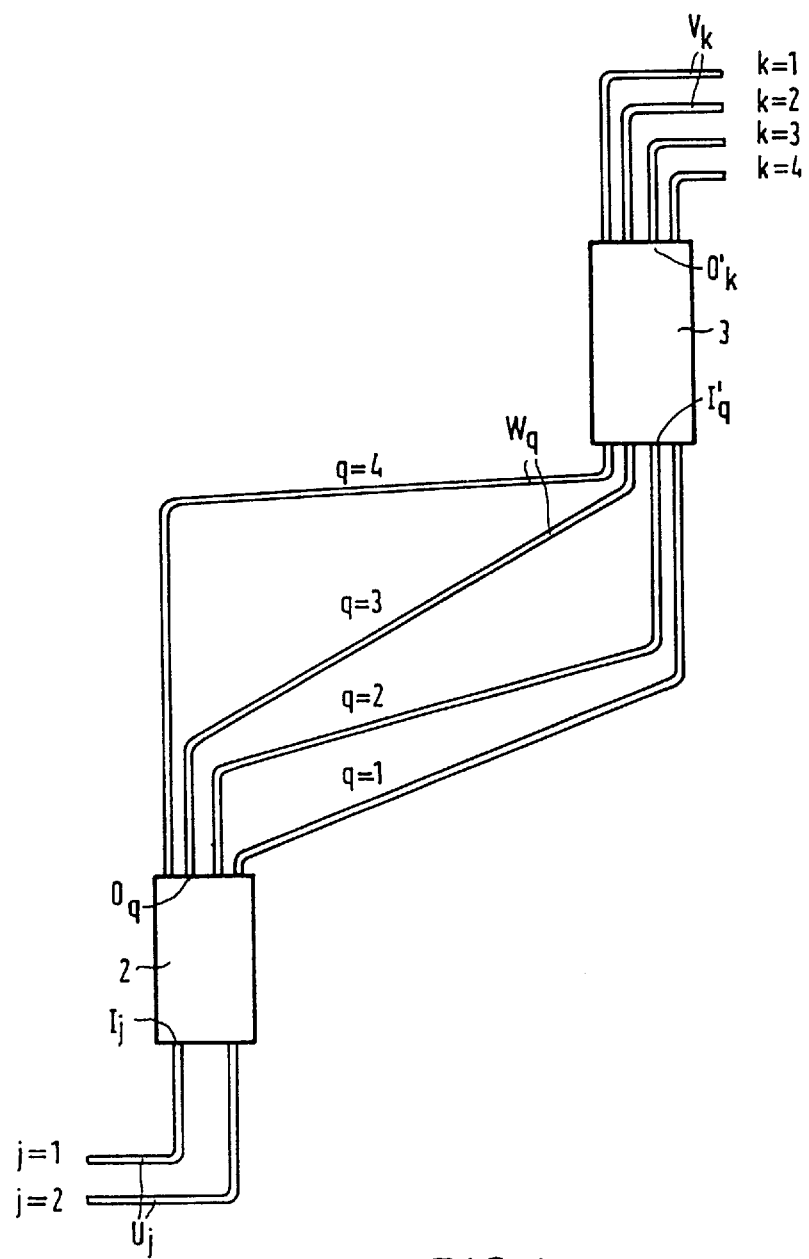
FIG. 4 shows a WDM with an S-shaped array.

In another embodiment of the optical device according to the invention, the phased array has an S shape. FIG. 4 shows a particular embodiment of this device in the form of a demultiplexer with two input channels $U_j$, four array channels $W_q$ and four output channels $V_k$. The S shape of the array does not impose the requirement that the length of the channels must increase with increasing q number. Hence, there is more freedom in choosing the parameter $r_q$, which freedom can be used to modify the wavelength transmission characteristics of the device. The design of the array shown in FIG. 4 is based on the choice $r_q=0$ for all q. The length increment of each array channel, i.e. the length difference between array channel $W_q$ and channel $W_1$, is $$n_0 \delta L_q = s_q m \lambda_0 \quad (38)$$

$$s_q = \frac{1-q}{2} \text{ for } q \text{ odd and} \quad (39)$$

$$s_q = \frac{q}{2} \text{ for } q \text{ even.} \quad (40)$$

The length increments $\delta L_q$ of the array channels for N=4 are $\delta L_q$=0, 1, −1, 2 times $m\lambda_0/n_0$ for q=1, 2, 3, 4 respectively. The ordinal numbers of the channels in order of increasing length are: q=3, 1, 2, 4. From equations (39) and (40) one can infer that the absolute value of the length difference $|s_q-s_{q-1}|m\lambda_0/n_0$ (q≧2) between neighbouring channels is a series of monotonically increasing values as function of q. Adjacent terms in the series have different signs. The lengths of the channels increase monotonically when taking first the odd numbered channels in decreasing order and then the even numbered channels in increasing order.

Equations (38), (39) and (40) define an arrangement of the channels by specifying the length of a channel as a function of its ordinal number. Other equivalent arrangements may be found by choosing an integer number, adding this to the values of $s_q$ as given by eqs. (39) and (40), and taking the new values of $s_q$ modulo N. The arrangement of the channels shown in FIG. 4 is according to eqs. (39) and (40) whith the different lengths of the channels implemented by different slopes of a straight intermediate section of each of the channels. The choice in length differences may be increased by using more bends and curved sections in the array channels. The channels may also consist of only curved sections, thereby making larger radii of curvature of the bends possible, which in turn reduces the radiation losses in the bends.

Figure 5:
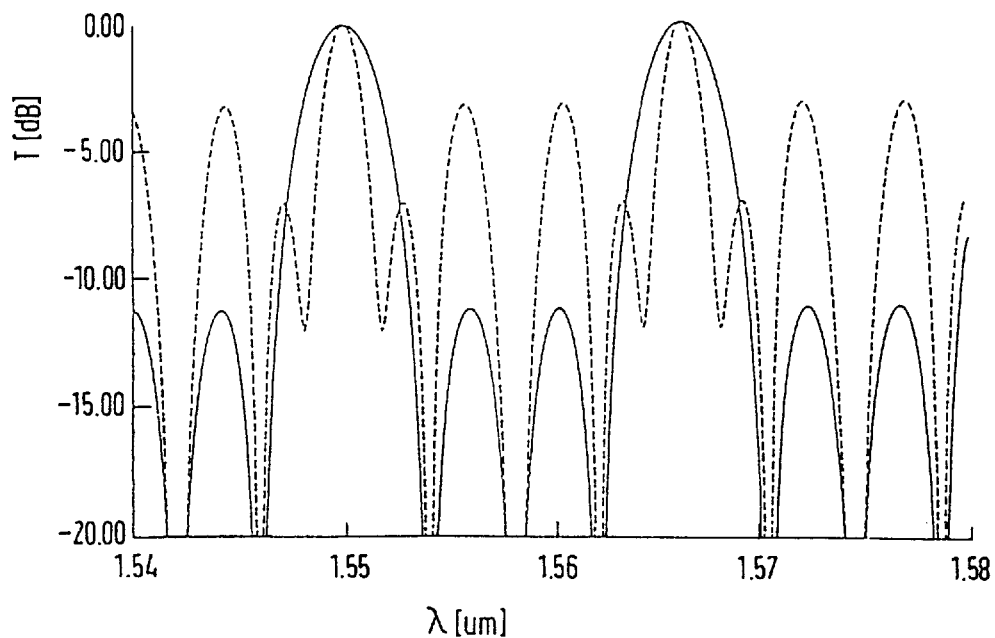
FIG. 5 shows the transmission characteristics of a WDM with a U-shaped array and a demultiplexer with an S-shaped array.

FIG. 5 shows the transmission characteristics of the demultiplexers of FIGS. 1 and 4. The horizontal axis gives the wavelength of the radiation entering input $U_1$, the vertical axis gives the transmission T as measured in the reference output channel $V_3$. The solid line gives the transmission of the demultiplexer with the S-shaped array, the dashed line the transmission of the demultiplexer with the U-shaped array. The reference wavelength $\lambda_0$ is 1.550 μm for which the output channel $V_3$ shows a maximum and the output channels $V_1$, $V_2$ and $V_4$ should have a minimum transmission. As the channel spacing $\Delta\lambda$ is about 4 nm for both devices, the output channels $V_1$, $V_2$ and $V_4$ should show a maximum transmission for wavelengths 1.546 μm, 1.542 μm and 1.538 μm, whereas for these wavelengths the output channel $V_3$ has a minimum transmission as shown in FIG. 5. The latter is a consequence of the design of the device. In theory the crosstalk from one output channel to another output channel is zero. However, due to manufacturing tolerances the transmission minima will not be zero, resulting in a finite crosstalk. The influence of the manufacturing tolerances is determined by the width of the transmission minimum around said wavelengths of 1.546, 1.542 and 1.538 μm. The greater the width, the smaller the influence of the tolerances. From the Figure it is clear that the width of the minimum for the drawn curve around the wavelength 1.546 nm is twice as wide as that for the dashed curve. Hence, the device with the S-shaped array will be less affected by manufacturing inaccuracies and, consequently, will have a lower crosstalk than the device with the U-shaped array.

Figure 6:
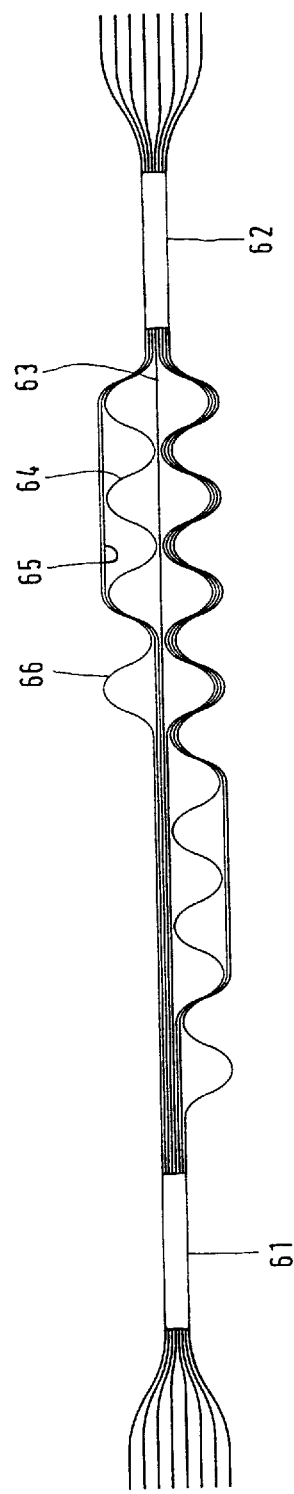
FIG. 6 shows a WDM with sinusoidal array.

FIG. 6 shows an embodiment of the optical device according to the invention which allows a great variation in pathlengths of the optical channels. Two 8×8 MMI's 61, 62 are connected by eight channels. Preferably one of the channels, 63, is straight. Each one of the other channels may comprise one or more sinusoidal bends, the pathlength of a channel increasing with the number of bends in the channel. A sinusoidal bend is a bend having the form of half a period of a sinusoid. The pathlength need not increase with increasing ordinal number of the channel, as shown by FIG. 6. The channels 64, 65 and 66, for example, have 6, 2 and 4 bends respectively. Hence, the ordinal numbers of the channels for increasing pathlength is 65, 66, 64.

Figure 7:
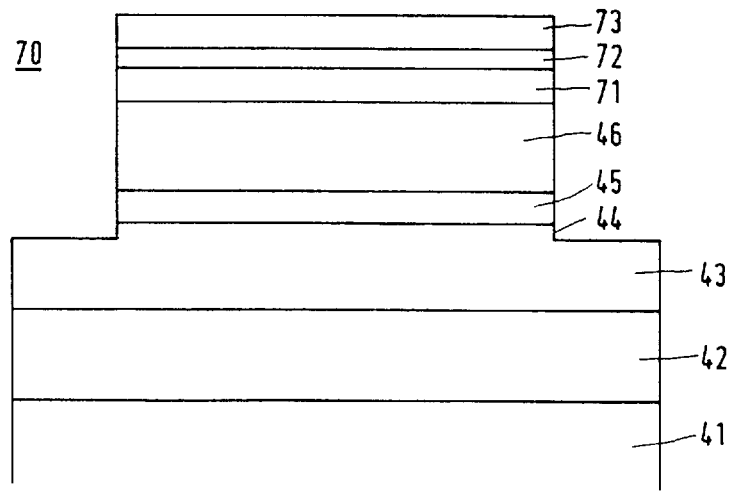
FIG. 7 shows a cross-section of a waveguide provided with an electrode.

The embodiments of the optical device according to the invention described in the preceding paragraphs comprise passive arrays, that is, arrays which are not controllable. However, the arrays can be made active by overlaying channels of the array with electrodes. In this way an electric field or an injection current can be imposed on the channels. A cross-section of a channel with an electrode is shown in FIG. 7. The rib-waveguide structure 70 comprises the same layers 41 to 46 as the rib-waveguide structure 40 shown in FIG. 3. Layer 46 is covered by a heavily doped p⁺-InP layer 71 and a heavily doped p⁺-InGaAs layer 72. A metal layer 73, made of for instance a TiPtAu alloy, on top of layer 72 forms a first electrode. The substrate 41 forms a second electrode. The device is controlled by applying an adjustable voltage across or current through the two electrodes.

In one embodiment each channel of the array may be overlaid with a separate electrode. By applying an individual voltage to each electrode, a desired tuning of the transmission function of the device can be achieved. A proper choice of the voltages may compensate the phase differences between optical paths in the MMIs, thereby making the small length increments $\delta l_q$ of the channels unnecessary. The large increments $\delta L_q$ determine the shape of the transmission function of the device.

Figure 8:
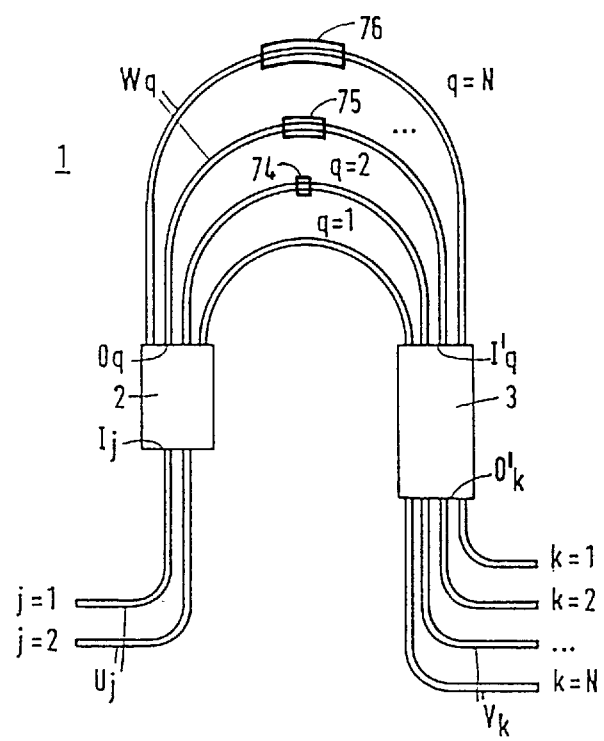
FIG. 8 shows a WDM with an active U-shaped array.
Figure 9:
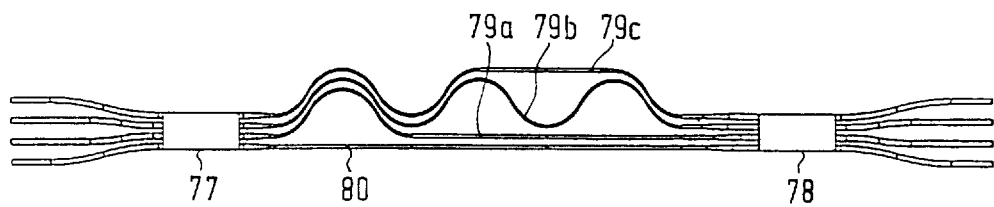
FIG. 9 shows a WDM with an active sinusoidal array.

In another embodiment the length of the electrodes is adapted to the ordinal number of the channel it overlays in such a way that the same voltage can be applied to all electrodes. The length of an electrode on a channel must then be proportional to the length difference between that channel and a reference channel. FIG. 8 shows an embodiment of the WDM of FIG. 1, provided with electrodes. Channel 1 is chosen as reference channel, and has therefore no electrode. The lengths of the three electrodes 74, 75 and 76 on channels q=2, 3 and 4, respectively, are in the ratio of 1 to 3 to 6, as prescribed by the length increments $\delta L_q$ for this embodiment as given under eq. (37). FIG. 9 shows a WDM with a sinusoidal array of the type shown in FIG. 6, but with electrodes overlaying the channels. The two MMI couplers are indicated by elements 77 and 78. A single electrode 79 overlays part of the sinusoidal bends in the channels. The width of the electrode is chosen such that the total length of the overlaid parts of a channel is equal to the length difference between that channel and straight channel 80. In order to reduce the capacity of the electrode 79 or for manufacturing reasons the electrode 79 may be replaced by one or more small, short electrodes on each waveguide, which are electrically connected in order to apply an equal voltage on them.

Figure 10:
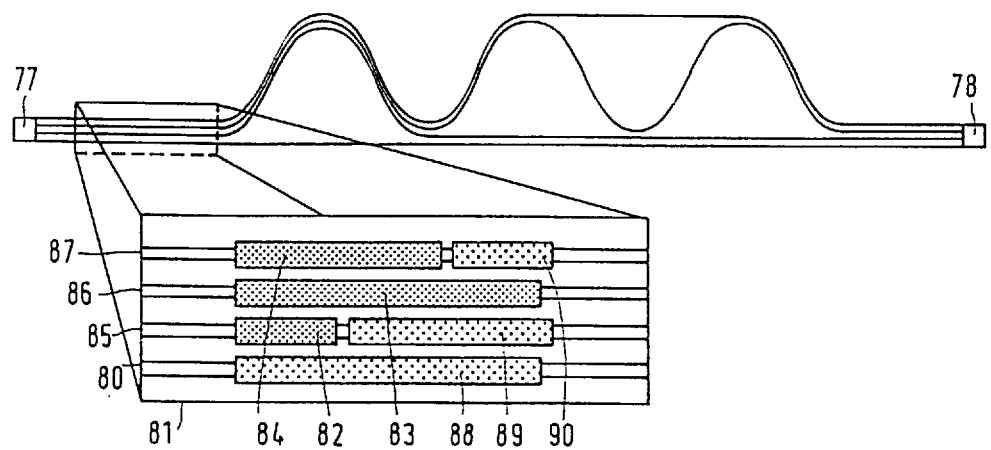
FIG. 10 also shows a WDM with an active sinusoidal array.

FIG. 10 shows an embodiment of the WDM of FIG. 9 with a different layout of the electrodes. The enlargement 81 of the section of the array comprising the electrodes, shows three electrodes 82, 83 and 84 arranged on channels 85, 86 and 87 respectively, the electrodes having a length proportional to the length difference between the corresponding channel and the straight channel 80. Three dummy electrodes 88, 89 and 90 on channels 80, 85 and 87 respectively have such a length that the total length of each channel overlaid with electrode is equal for all channels. This has the advantage that losses in a channel due to the electrodes are equal for all channels, thereby avoiding a degradation of the crosstalk of the device.

Although the invention has been described principally with reference to a wavelength demultiplexer, it will be clear that the scope also encompasses wavelength multiplexers, which perform the opposite operation to that of a demultiplexer, and wavelength routers. The inherent periodicity of the transmission of the device according to the invention make it very suitable for use in optical communication systems. For instance, a phased array device with a single input channel and a single output channel operates as an optical comb filter. When the length increments $\delta L_q$ of the array channels in the S-shaped configuration is made equal to zero, the device has no dispersive power and acts as a planar lens.

We claim:

1. An optical device comprising a first coupler, a second coupler and a plurality of at least three optical channels connecting outputs of the first coupler to inputs of the second coupler and forming a dispersive array; characterized in that at least one of the couplers is a multimode-imaging component, and in that phase differences between optical paths in the multimode-imaging component are compensated by differences in optical pathlength of neighboring channels in said array.

2. An optical device according to claim 1, characterized in that the differences in optical pathlength between neighboring channels in said array are substantially equal to an integral multiple of a basic length, where the value of said integral multiple depends on the ordinal numbers of the neighboring channels in said array.

3. An optical device according to claim 1, characterized in that the first coupler has two inputs and N outputs and the second coupler has N inputs and N outputs, with N an integer larger than 2.

4. An optical device according to claim 1, characterized in that the at least three optical channels are configured in an S-shape.

5. An optical device according to claim 4, characterized in that the absolute value of the difference in optical pathlength between an optical channel having a given ordinal number and a neighboring optical channel of next higher ordinal number is a monotonically increasing function of the given ordinal number, and consecutive differences have different signs.

6. An optical device according to claim 1, characterized in that different optical channels of the array comprise a different number of sinusoidal bends.

7. An optical device according to claim 1, characterized in that an electrode overlays at least one channel for introducing phase changes in the at least one channel.

8. An optical device according to claim 7, characterized in that the length of a channel overlaid by an electrode is proportional to the difference in optical pathlength between that channel and a reference channel.

9. An optical device according to claim 7, characterized in that at least two channels are each overlaid by a respective electrode.

10. An optical device according to claim 9, characterized in that the length of a channel overlaid by an electrode is proportional to the difference in optical pathlength between that channel and a reference channel.

11. An optical device according to claim 1, characterized in that each channel is overlaid by at least one electrode and a dummy electrode, and the total lengths of the channels overlaid by the electrodes are equal.

* * * * *